ns011636125B1

United States Patent
Carmona Perez et al.

(10) Patent No.: US 11,636,125 B1
(45) Date of Patent: Apr. 25, 2023

(54) NEURAL CONTRASTIVE ANOMALY DETECTION

(71) Applicant: Amazon Technologies, Inc., Seattle, WA (US)

(72) Inventors: Christian Uriel Carmona Perez, Zurich (CH); Francois-Xavier Benoit Marie Aubet, Vienna (AT); Valentin Flunkert, Berlin (DE); Jan Gasthaus, Munich (DE)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 17/364,212

(22) Filed: Jun. 30, 2021

(51) Int. Cl.
    *G06F 16/2458*     (2019.01)
    *G06N 3/08*     (2023.01)

(52) U.S. Cl.
    CPC ...... *G06F 16/2465* (2019.01); *G06F 16/2474* (2019.01); *G06N 3/08* (2013.01)

(58) Field of Classification Search
    CPC .................................... G06F 16/2465–2474
    See application file for complete search history.

(56) References Cited

U.S. PATENT DOCUMENTS

| | | | | |
|---|---|---|---|---|
| 11,037,173 | B1* | 6/2021 | Gurnov | H04L 41/0631 |
| 2009/0234899 | A1* | 9/2009 | Kramer | G06F 16/2465 |
| | | | | 708/200 |
| 2014/0379630 | A1* | 12/2014 | Horvitz | G16H 50/20 |
| | | | | 707/603 |
| 2018/0260560 | A1* | 9/2018 | Gross | G06N 20/00 |
| 2020/0160230 | A1* | 5/2020 | Wang | G06F 16/35 |
| 2020/0210393 | A1* | 7/2020 | Beaver | G06F 17/18 |
| 2021/0042382 | A1* | 2/2021 | Freeman | G06F 16/2465 |

* cited by examiner

*Primary Examiner* — Robert W Beausoliel, Jr.
*Assistant Examiner* — Nirav K Khakhar
(74) *Attorney, Agent, or Firm* — Davis Wright Tremaine LLP

(57) ABSTRACT

Systems and methods are described for detecting anomalies within data, such as time series data. In one example, unlabeled data, such as time series data, may be obtained. At least one data point, representing an artificial anomaly, may be inserted into the data. The data may then be divided into a number of different windows. The windows may have a fixed size and may at least partially overlap in time. The data contained within different windows may be compared, to each other and to the injected data point, to determine an anomaly score for individual windows. The anomaly score may indicate a likelihood that a given window contains an anomaly. In a specific example, a convolution neural network may be trained based on the data and inserted data points representing anomalies, where a contrastive loss function is used to represent different portions of the data in the neural network.

20 Claims, 12 Drawing Sheets

NEURAL CONTRASTIVE ANOMALY DETECTION

BACKGROUND

Anomaly detection is an important problem in data mining. Existing approaches to anomaly detection typically assume a setting in which no labeled examples of anomalies are available, and anomalies are defined as observations that are "different" from the majority of data observed before. However, in many practical applications of anomaly detection, it may be important to detect well-known failure modes.

BRIEF DESCRIPTION OF THE DRAWINGS

Various techniques will be described with reference to the drawings, in which.

DETAILED DESCRIPTION

Figure 1:
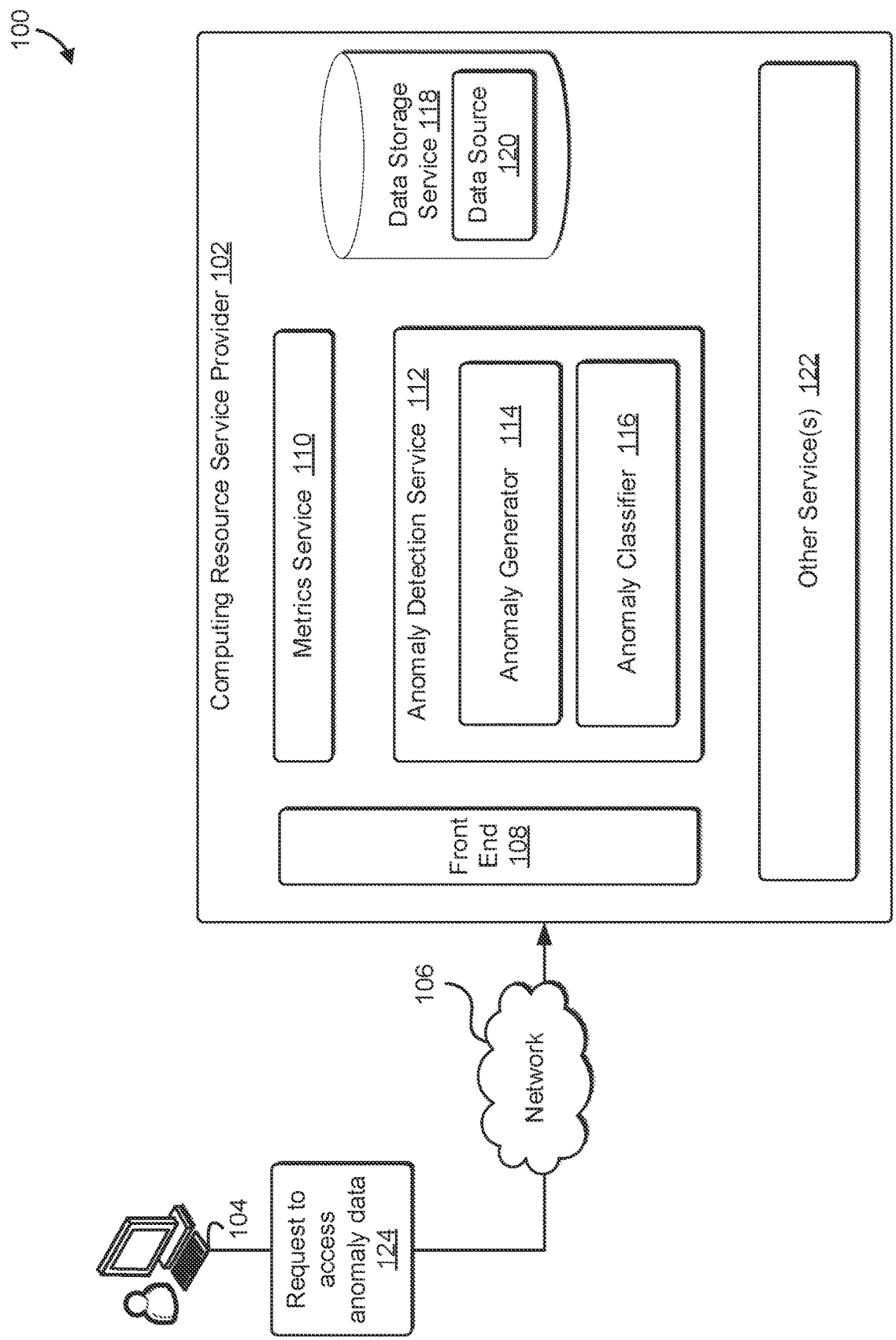
FIG. 1 illustrates an example environment in which the described techniques can be practiced, according to at least one embodiment.

Various systems and methods are described herein relating to using machine learning techniques to detect anomalies in time series data. In some examples, data augmentation using synthetically generated anomalies may be combined with a contrastive training approach to better detect anomaly in time series data, labeled and unlabeled alike. In many practical applications, in addition to a large number of unlabeled time series, prior information about the type and shape of the expected anomalies is available. If such prior knowledge is available, using the proposed techniques, that knowledge may be encoded in the form of simple generative models, which may then be used to inject or insert synthetic anomalies into the available data. Even without such knowledge, the described techniques are similarly effective when combined with simple task-agnostic anomaly generators. The data, including some form of labeled anomalies, either synthetically generated or labeled, may then be analyzed using a contrastive loss function. The contrastive loss function may be applied between two different segments or embeddings from different parts of the time series data, to detect abnormal values in the time series data, and hence detect anomalous data. The described techniques can scale from no available labels, to the semi-supervised and fully-supervised settings.

In some aspects, an anomaly detection service may obtain time series data that contains unlabeled data. The time series data may also contain labeled data, such that it includes data labeled or otherwise identified as anomalous. One or multiple data points, representing anomalies in the time series data, such as anomalies having specific characteristics that are desired to be detected, may be inserted or otherwise added into the time series data. The time series data may then be segmented into a number of windows, which may overlap in time. Individual windows may additionally be separated into a context window and a suspect window, respectively. The suspect window may include a portion of data that is being monitored or analyzed for the presence of anomalies, whereas the context window may be a portion of the data that is used to compare with the data contained in the suspect window to, for instance determine a baseline or expected characteristics of the data. The length of the various windows may be selected based on one or more characteristics of the data, such as based on periodic behavior of the data. An anomaly score may then be determined for individual suspect windows based on a comparison of the time series data in a given window with the time series data in a given context window and based on the injected anomaly or anomalies. The anomaly score may indicate a likelihood that the given suspect window contains an anomaly. A model, such as a convolution neural network, may be training using the time series data and the injected anomalies and used to determine the anomaly score for time series data. The different segments of a window, such as an entire window and a corresponding context window, may be compared using a contrastive loss function to determine if an anomaly is present in the corresponding suspect window. In some cases, various windows or segments of the time series data may be compared to determine anomalous data.

Synthetic or generated anomalous data points may be generated a number of different ways. In one example, when little is known about characteristics of anomalies desired to be detected, a segment of the data may be placed at another point in time in the data or two segments of the data from different times may be swapped. In another example, a change point or different amplitude or frequency of the data may be introduced randomly into the time series data. In yet other examples, other changes to be made to the data may be determined based on what type of or characterizes of anomalies are desirous to detect.

Detecting anomalies in real-valued time series data has many practical applications, such as monitoring machinery for faults, finding anomalous behavior in information of things (IoT) sensor data, tracking of computer applications and (cloud) infrastructure, monitoring patients vital signs, among many others.

Classically, anomaly detection is cast as an unsupervised learning problem, where the training data contains both normal and anomalous instances (but without knowing which is which), and no labeled anomalous instances are available. However, in many practical applications of anomaly detection, e.g., in the monitoring setting mentioned above, treating anomaly detection as fully unsupervised can leave valuable information unutilized. It is often possible to obtain (small amounts of) labeled anomalous instances, and to characterize the relevant anomalies in some way. While detecting "unknown anomalies" (e.g., anomaly patterns that have never been observed before) is important, it is often equally important to detect well-known failure modes. Practical anomaly detection applications thus can benefit from a combination of detecting known anomaly patterns occurring within a diverse range of normal time series behavior, and detecting novel anomalous patterns that are significantly different from any of the normal patterns observed before.

The techniques described herein address these needs of practical time series anomaly detection applications. A primary advantage of the described techniques is that these techniques can easily incorporate additional information, both in the form of labeled examples (semi-supervised) and in the form of synthetic anomalies characterizing known failure modes that are injected into unlabeled examples.

In one example, each time series of data may be separated into overlapping, fixed-size windows. Each window is then further subdivided into two parts: a context window and a suspect window. The whole window and the context window are separately embedded into a fixed-size vector representation using a neural network architecture. In some cases, the neural network may be a convolution neural network, temporal convolution neural network, or various other types of neural networks. The model is trained by optimizing a loss function contrasting the two resulting embeddings, pulling the embeddings closer together if the suspect window is non-anomalous and further apart if there is an anomaly. The suspect window label is induced either via the true label (if available in the supervised setting), or by artificially creating anomalous instances using synthetic anomaly injection techniques. The distance between the two embeddings can then be used as an anomaly score, which can be aggregated based on multiple overlapping windows and converted into anomaly decisions via thresholding.

In some aspects, the described techniques may include one or more of a framework for time series anomaly detection that achieves state-of-the-art performance in the unsupervised, semi-supervised, and fully-supervised settings, a novel contrastive learning paradigm and loss function that improves accuracy and data efficiency while using a simple model, and using generic synthetically generated anomalies to boost the performance in both the unsupervised and supervised settings, using specialized anomaly injectors to guide the model to identify anomalies that are relevant for a given application.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more robust and efficient anomaly detection in time series data that is unsupervised, thus reducing the amount of memory needed to store supervised data, 2) data agnostic techniques to detect anomalies in time series data, supervised or unsupervised, and other benefits and advantages that are described throughout this disclosure.

FIG. 1 illustrates an example environment 100 in which an anomaly detection service 112 may be provided by a computing resource service provider 102. A client 104 may interact with the computing resource service provider 102 via a front end 108 of computing resource service provider 102 over one or more networks 106 to interact with various data and services, such as through one or more of a metrics service 110, an anomaly detection service 112, a data storage service 118, and/or other services 122, as will be described in greater detail below.

Client 104 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of a metrics service 110, an anomaly detection service 112, a data storage service 118, and/or other services 122.

Client 104 may submit a request 124 for access to various computing resources (e.g., services or computing resources thereof) of computing resource service provider 102. The request 124, in some examples, is a web service application programming interface request (also referred to simply as a web service request), may be received by a service of the computing resource service provider 102. As illustrated, the client 104 may submit a request 124 to access or interact with anomaly data. The request 124 may be directed to one or more services provided by the computing resource service provider 102, and may include a request to access data and anomaly data relating thereto via a metrics service 110, an anomaly detection service 112, a data storage service 118, and/or other services 122. In some cases, the request 124 may include anomaly data for configuring the anomaly detection service 112 to detect certain types or characteristics of anomalies, and/or identification of certain data to monitored for the detection of anomalies.

In some examples, request 124 may include one or more of: an indication of a source of time series data to evaluate, a location of where to put detected anomalies, an indication of what users are allowed to provide feedback, an initial configuration (such as sensitivity, indication of what is or is not of interest as anomalies, thresholds, etc.), what type of anomaly to detect, when to present an anomaly, an indication of who is to receive anomalies or indications of their existence, a namespace that includes the metric, a period for evaluation, a statistic or percentile to use, data points to alarm and/or provide an anomaly indication, an indication of treatment of missing data (treat as acceptable, ignore, treat as unacceptable, etc.), etc.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a metrics service 110, an anomaly detection service 112, a data storage service 118, and/or other services 122 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 12. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a metrics service 110, an anomaly detection service 112, a data storage service 118, and/or other services 122. Each of these services may provide ways for a customer to interact with various forms of data, including using the one or more services to detect anomalies in the data.

As illustrated, the metrics service 110 may be a collection of computing resources configured to analyze data, such as from one or more data sources 120, and/or obtain, organize, and or generate various metrics pertaining to that data. The metrics service 110 may access a data source, such as data source 120, from a data storage service 118 provided by the computing resource service provider 102, and/or via other data sources maintained, stored, or accessed external to the computing resource service provider 102. The metrics service 112 may perform one or more of the following functions: collecting and storing logs, collecting metrics, including of time series data, aggregating metrics, generating alarms, etc., on the data. The metrics service 110 may generate metrics pertaining to a data source 120, which may be used by an anomaly detection service 112 to detect anomalies within a data source 120. In some embodiments, the anomaly detection service 112 may in whole or in part be part of a metrics service 110. In other cases, the metrics service 110 and the anomaly detection service 112 may be separate. In some cases, the metrics service 110 may modify the data source 120 in one or more ways, such as extracting only metrics of the data source 120 that are relevant or specified (e.g., via request 124) for anomaly detection. The metrics service 110 may then route the modified data source to the anomaly detection service 112.

The anomaly detection service 112 may be a collection of computing resources configured to analyze data, such as obtained and/or monitored from a data source 120 (e.g., modified by the metrics service 110), on behalf of a customer 104 to detect anomalies within that data. In some aspects, the anomaly detection service 112 may generate or access one or more models, such as machine learning models, neural networks, etc., to be used in detecting anomalies within data originating from a data source 120. In some cases, the anomaly detection service 112 may interact with one or more of metrics service 110 and/or any of a variety of other services, such as may be provided by the computing resource service provider 102, to detect anomalies within various data of interest. In some cases, a data source (not illustrated) may reside in another service 122, such that the anomaly detection service 112 may receive data from the other service 122 for analysis. In yet some cases, the anomaly detection service 112 may obtain metrics or other metadata of certain customer data, from another service 122 and/or from metrics service 110 to be used in detecting anomalies within the data of interest. In other examples, the anomaly detection service 112 may obtain data from a data source external to the computing resource service provider 102.

In some aspects, the anomaly detection service 112 (via appropriately configured and authenticated API calls) may provision and/or access virtual computer systems that are instantiated on physical computing devices hosted and operated by the computing resource service provider 102. The virtual computer systems may be used for various purposes, such as to operate as servers supporting data storage for a customer coupled with compute capabilities to search, query, access, and perform other operations on the customer data, such as to aid in creating models, and detecting anomalies or anomalous behavior within that data.

In some cases, the anomaly detection service 112 may use operational domain knowledge of metrics, provided by metrics service 110, to select and/or configure models and the training/using of the models to detect anomalies. In some examples, the anomaly detection service 112 generates artificial anomalies or indications or real thereof, from time series data provided by a data source, such as data source 120 stored by data storage service 118. The anomaly detection service 112 may include or have access to, a plurality of different machine learning models or other anomaly detection mechanisms, such as statistical models and the like. These models and algorithms may be used to analyze metrics of systems and applications, determine normal baselines, and surface anomalies with minimal user intervention. Enabling anomaly detection for a metric may cause the anomaly detection service 112 to access past metric data through the metrics service 110 to generate a model of the metric's expected values. The model may assess both trends and hourly, daily, and weekly patterns of the metric.

The anomaly detection service 112 may be configured to detect one or more anomalies within a data source, such as data source 120 across one or multiple metrics or dimensions. In some aspects, the anomaly detection service 112 may be configured to detect specific types or classes of anomalies, such as across one or multiple specific metrics. In other examples the anomaly detection service 112 may be configured to detect a variety of different types of anomalies across a wide variety of dimensions or metrics. In some cases, anomaly detection service 112 may monitor REST APIs, URLs, and website content, checking for unauthorized changes from phishing, code injection and cross-site scripting, and various other indications of events recorded by one or more applications, services, etc. Anomaly detection service 112 may monitor detect anomalies within a data source 120 with or without modifying the data in the data sources 120.

Based on the metrics (time series data) to evaluate, the anomaly detection service 112 may select one or more models to use in detecting anomalies within data. Types of anomalies and alarms differ between types of metrics, types of applications, etc. Annotating anomalies with types allows for the flexibility to pick the right type of anomalies based on the metric and/or user feedback. User feedback and unique metric requirements are used to adjust what model is used (for example, based on an annotation of a data set, anomaly, etc.), retrain a model, set different thresholds for reporting, etc. For example, user feedback may be used to: adjust importance of an anomaly or insight of the anomaly, adjust what type of anomalies are used to create an insight for a metric, etc. For example, if a user gives feedback that seasonal anomalies are not useful for a certain metric, those anomalies are muted. To get better feedback, the type of anomaly is used to generate explanations which are shown the user. For example, if the anomaly is due to trend changes, the user may be shown the explanation of how the trend changed. Domain knowledge may be used to annotate metrics and select which models are used by the anomaly detection service 112 to create anomalies and rules used for threshold based anomalies. Domain knowledge may also be used to determine when to alarm on an anomaly.

To handle unknown metrics, the anomaly detection service 112 may start in a conservative state such that only high threshold breaches generate alarms and other detectors are selected based on metadata annotator's analysis. For example, if a detector configuration generator classifies time series as continuous and stationary, change-point and missing-value detectors are typically selected. Alarms are adjusted based on user feedback. For example, for the custom metric, the user may provide feedback that threshold breaches at a lower end of the metric are not alarmable and thus new alarms for such an event are not generated.

In some cases, the anomaly detection service 112 may include an anomaly generator 114. The anomaly generator 114 may be a process or processes executed by the anomaly detection service 112 to create artificial anomalies (e.g., data points), that can be injected into data, such as time series data, for purposes of training models to detect future anomalies. Examples of different type of anomalies that can be generated are described in greater detail below, in reference to FIGS. 8 and 9. In some cases, the anomaly generator 114 may access or obtain metrics data from metrics service 110 to aide in generating artificial anomalies or data points. In some aspects, the anomalies generated by the anomaly generator 114 may be used to create and/or train one or models to be used for anomaly detection and classification, such as by the anomaly classifier 116.

The anomaly detection service 112 may also include an anomaly classifier 116. The anomaly classifier 116 may be a process or processes executed by the anomaly detection service 112 to detect anomalies or anomalous data points (or ranges of data points) within time series data. The anomaly classifier 116 may utilize one or more models, as will be described in greater detail below, to detect and classify certain segments of data, such as time series data.

In some examples, the computing resource service provider 102 may provide data storage through a data storage service 118 to store and manage large volumes of data, including image and other media data, which may collectively be referred to herein as a data source 120. In some cases, the data storage service 118 may interact with anomaly detection service 112 and/or the metrics service 110 to enable detection and/or generation of metrics relevant to data stored by the data storage service 118. Data storage service 118 may be an on-demand data storage service, such as an object-based data storage service, and may be configured to store various forms of media. The data storage service 118 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein.

In some examples, data stored in the data storage service 118, which may collectively form a data source 120 may be organized into data objects, in one or more logical data containers. Data source 120 may be a collection of data having one or more similar attributes. In one example, a data source may be a collection of data spanning a certain time period, which is generated from or by a customer application or service, such as provided by the computing resource service provider 102. The data storage service 118 and/or the data source 120 may include one or more data objects, which may have arbitrary sizes and may, in some instances, have constraints on size. Thus, the data storage service 118 may store numerous data objects of varying sizes. The data storage service 118 may operate as a key value store that associates data objects with identifiers of the data objects which may be used by the client 104 to retrieve or perform other operations in connection with the data objects stored by the data storage service 118. Access to the object-based data storage service 118 may be through application programming interface (API) calls to the service or via an interface, such as a graphical user interface (GUI).

In some aspects, data source 120 may include data obtained from a specific application or service, such as virtual computing resources including virtual machines, containers, etc., data storage services, and other services or entities running within or outside of the computing resource service provider. The data source 120 may include various metrics gathered by metrics service from another data source, logs, and other forms of data.

In some cases, the data storage service 118 may operate as a key value store that associates data objects with identifiers of the data objects which may be used by the client 104 to retrieve or perform other operations in connection with the data objects stored by the data storage service 118. Access to the data storage service 118 may be through application programming interface (API) calls to the service, for example from either directly from client 104, or via the computing resource service provider 102. It should be appreciated that the data storage service 118 may additionally or alternatively provide non-object based data storage, such as block data storage, table-oriented data storage, relational databases, file-based storage, and the like. The data storage service 118 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

In one example operation of anomaly detection service 112, the computing resource service provider 102 may receive a request to configure detection of anomalies within a data source 124 through a network 106. The front end 108 of provider 102, responsive to the request 124, may instruct the anomaly detection service 112 to access a data source 120, such as from or through a data storage service 118. In some cases, where the request 124 includes information pertaining to specific types or characteristics of anomalies desired to be detected, the anomaly generator 114 may access that data and generate one or more artificial anomalies based thereon. In cases where anomaly information is not available or provided with request 124, the anomaly generator 114 may utilize more generic techniques to generate artificial anomalies. In either case, the artificial anomalies, in addition to, in some cases, data from metrics service 110, may be used to train one or more models usable to detect anomalies within data source 120. The anomaly classifier 116 may use the one or more trained models to subsequently detect one or more anomalous data points within the data from data source 120. In some cases, the anomaly classifier 116 may use a contrastive loss function to classify anomalies and/or train the models used to detect anomalies, as will be described in greater detail below.

Figure 2:
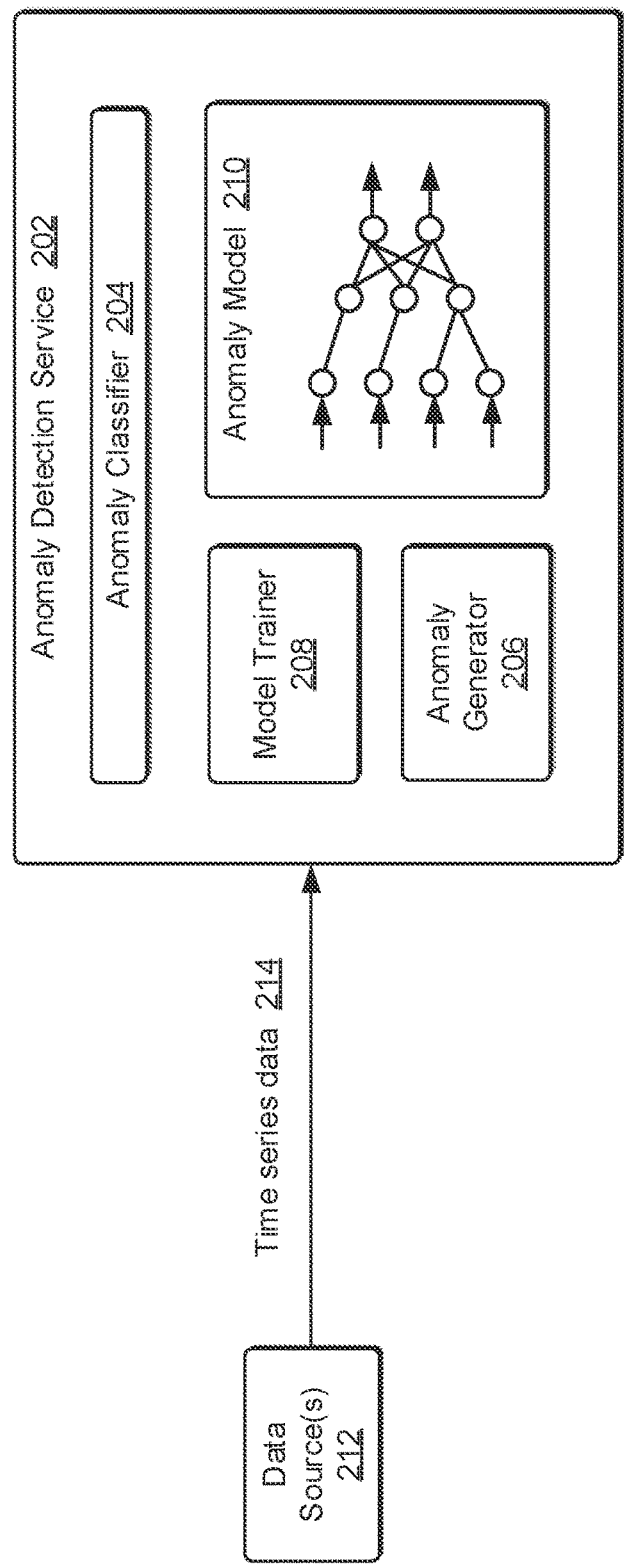
FIG. 2 illustrates an example of an anomaly detection service in which the described techniques may be implemented.

FIG. 2 illustrates a more detailed example of an anomaly detection service 202 in which the described techniques may be implemented. Anomaly detection service 202 may incorporate one or more aspects of anomaly detection service 112 described above in reference to FIG. 1. In the illustrated example, anomaly detection service 202 may include an anomaly classifier 204, and anomaly generator 206, a model trainer 208, and one or more anomaly models 210. The anomaly detection service 202 may obtain time series data 214 from one or more data sources 212. Data source 212 may include data that has been stored in one or more data stores, streaming data, metrics data generated or modified by a metrics service, such as service 110, or combinations thereof.

Anomaly classifier 204 may utilize various data, and/or models 210 to characterize portions of data within data source as anomalous. The anomaly classifier 204 may ingest data, such as from data source 212, and determine whether anomalies exit within that data. This may include obtaining data and segmenting the data into segments or windows, such as corresponding to different time periods within time series data. As used herein, time series data may refer to any collection of data that includes a series of data points in time order. Examples described herein refer primarily to time series data, but it should be appreciated that other forms of data, not necessarily arranged in time order, may also be used. As will be described in greater detail below in reference to FIGS. 3-7, data may be segmented into windows, and further segmented into context and suspect windows, whereby the data in a window may be compared to data in another window to determine if an anomaly exists in one of the windows. The anomaly classifier 204 may utilize one or more anomaly models 210 to determine if certain data within a data source 212 has one or more characteristics of an anomaly. The anomaly classifier 204 may obtain data, segment it into one or more windows, and compare the data within at least one window, or a representation thereof, to the model 210 to determine if that data is consistent with an anomaly. The anomaly classifier 204 may output a score, which may then be compared to one or more thresholds, to determine if the data of interest contains an anomaly.

In some cases, anomalies may be defined or characterized in a number of different ways, such as value or range based (e.g., if latency is above this threshold, or data throughput is outside of a given range), relative difference (e.g., more than 20% difference from values within a certain time period), and so on. In some cases, anomalies may be initially defined in such a way, where a model may be trained to detect such anomalies. This may be accomplished by setting thresholds that can be used to classify data as within the normal bounds of expected data or outside of these bounds, or anomalous.

In some cases, the anomaly classifier 204 may determine which metrics are of interest for anomaly detection. In some examples, the metric or metrics for which anomalies are to be detected may be specified in a request to configure the anomaly detection service 202, such as in request 124 described above in reference to FIG. 1. In this example, only relevant portions of the data source 212 may be analyzed to detect anomalies, where the portions analyzed are selected based on what metrics are of interest. In other examples, data from data source 212 may be analyzed for a variety of different anomalies spanning multiple and in some cases, unspecified metrics.

In some cases, the anomaly classifier 204 scans for metrics (e.g., from a metrics service 110) to determine which metrics to add or delete for anomaly detection. In some embodiments, metrics are added/deleted by specific user request. In some embodiments, the anomaly classifier 204 formats the time series data from data source 212 prior to analyzing it and/or presenting it to model trainer 208 to be input into one or more models 210.

Anomaly generator 206 may utilize various data to generate one or more artificial anomalies. In some cases, anomaly generator 206 may obtain data specified by a request from a client device, which includes one or more patterns, characteristics, etc., of anomies to be detected. In other cases, anomaly generator 206 may generate one or more artificial anomalies using more generic or general techniques, as will be described in greater detail in reference to FIGS. 8 and 9 below.

Model trainer 208 may receive as inputs data from data source 212, any supervised data that is already labeled as anomalous, and any artificial anomalies generated by anomaly generator 206. The model trainer 208 may then create and modify one or more models 210 using the unsupervised data, semi-supervised data (artificial anomalies) and supervised data or labeled anomalies. In some cases, the model trainer 208 may use a contrastive loss function to map similar data to be similarly represented in at least one dimension within the model 210. This may take the form of a distance metric, such that similar data points may be mapped as having a small distance between them, whereas a normal data point and an anomalous data point may have a greater distance between them. In other cases, a variety of other functions may be used to map or represent various data points within model 210, such that the model 210 can then be used to differentiate between normal or expected data points and anomalous data points.

Anomaly model(s) 210 may include any of a variety of different types of models, including various machine learning or deep learning models, neural networks, etc. In some examples, model 210 may include one or more convolution neural networks, and/or may utilize structural equation modelling. Model(s) 210 may be trained by model trainer 208 in various ways.

In some aspects, the model trainer 208 takes in metric metadata (domain knowledge such as known latency metrics, etc.), the time series data (metrics), system update information, (global usage knowledge such as an analysis of data usage in the provider network), and/or other forms or sources of data to configure one or more models 210 for anomaly detection. In some cases, the model trainer 208 uses this and/or other information to determine which of multiple models 210 to use for a specific request/type of data to be used to detect potential anomalies within the time series data.

In some embodiments, the model trainer 208 analyzes metrics and determines attributes (annotations) to the data for use by the anomaly classifier 204/model(s) 210. Examples of annotations include, but are not limited to: a metric resource type (stream, database, etc.); a metric type such as throttle, request rate, latency, error rate, custom, etc.; metric features such as seasonality period(s), stationary, etc.; metric limit thresholds; and metric domain knowledge. The model trainer 208 uses this information to configure one or more models 210. The configuration may include one or more of: the metric to evaluate, how to configure the model, domain knowledge metadata of interest (e.g., thresholds, aggregation information), and the time series data. The model trainer 208 may also receive user feedback to adjust model sensitivity, what items are not of interest (which can then be used to retrain a model to ignore an observation), etc.

The anomaly classifier 204 takes in time series data (and in some instances metric metadata) as input and generates, as configured, anomaly indications as events (event start/end) and type as output. In some embodiments, the anomaly indications include a score. In some cases, the score may be a numeric score (e.g., from 1-10, 1-100, etc.). In some cases, multiple indications are collected and then compared to one or more thresholds before determining if an anomalous has been detected.

Figure 3:
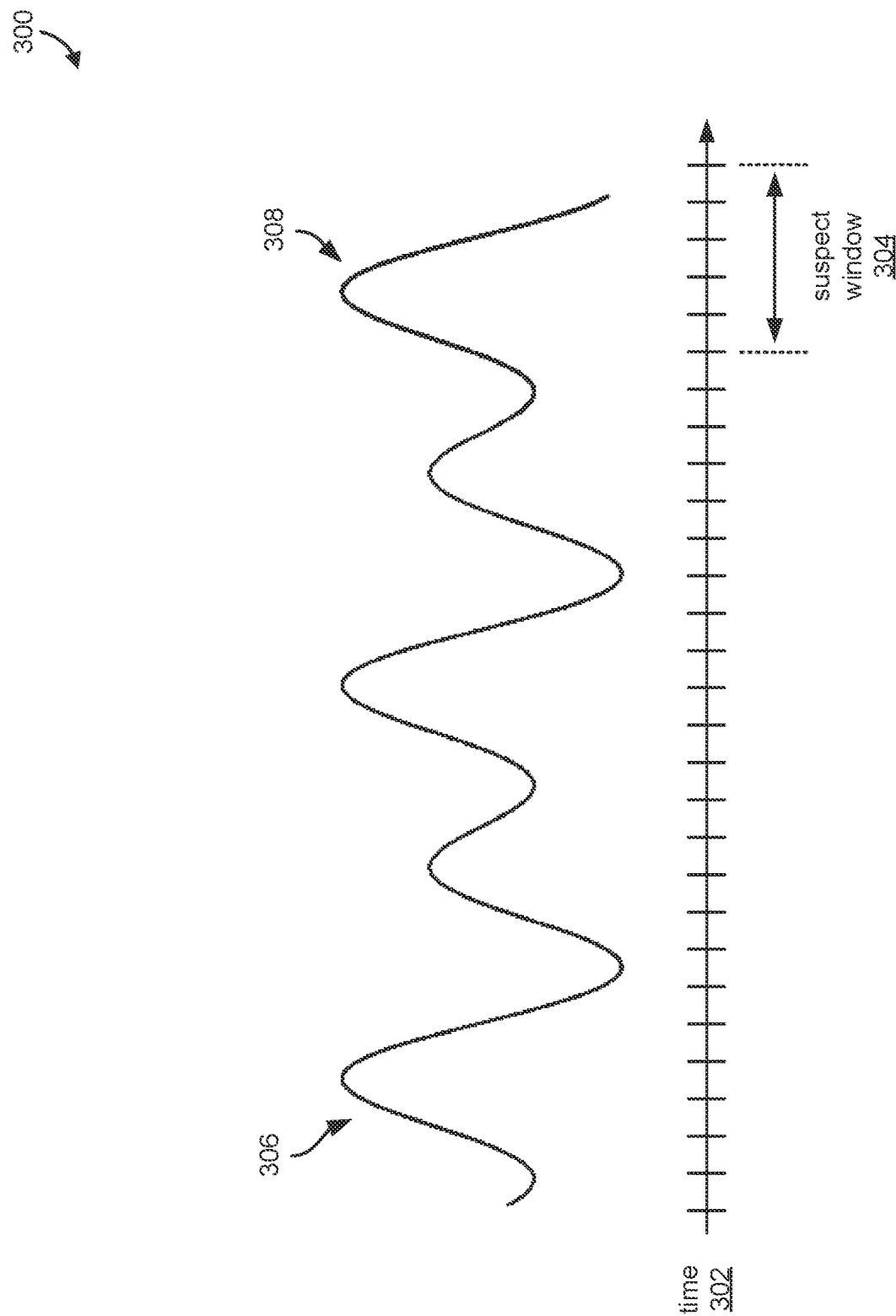
FIG. 3 illustrates an example of time series data in which the described techniques can be practiced.
Figure 4:
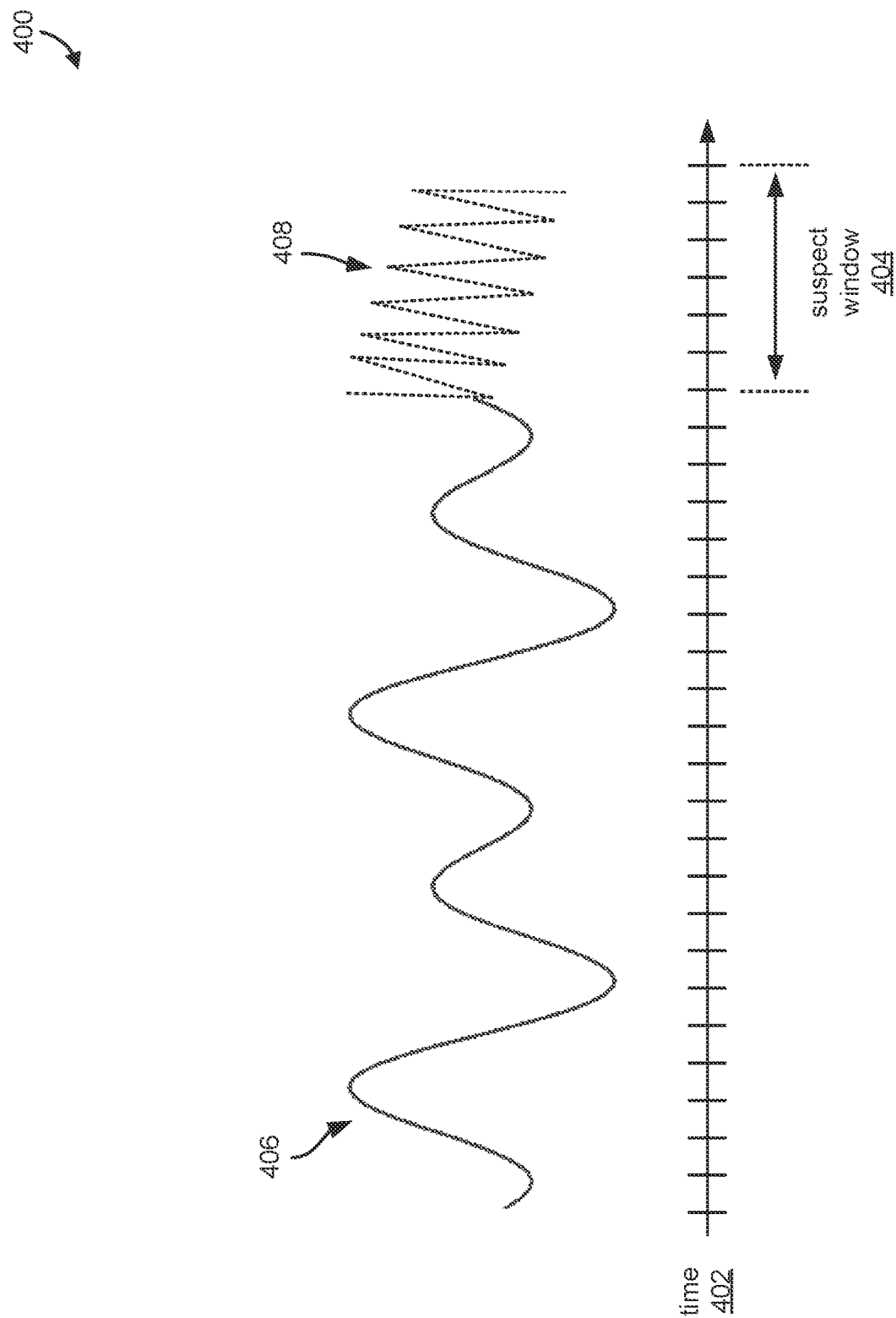
FIG. 4 illustrates an example of time series data containing an anomaly in which the described techniques can be practiced.
Figure 5:
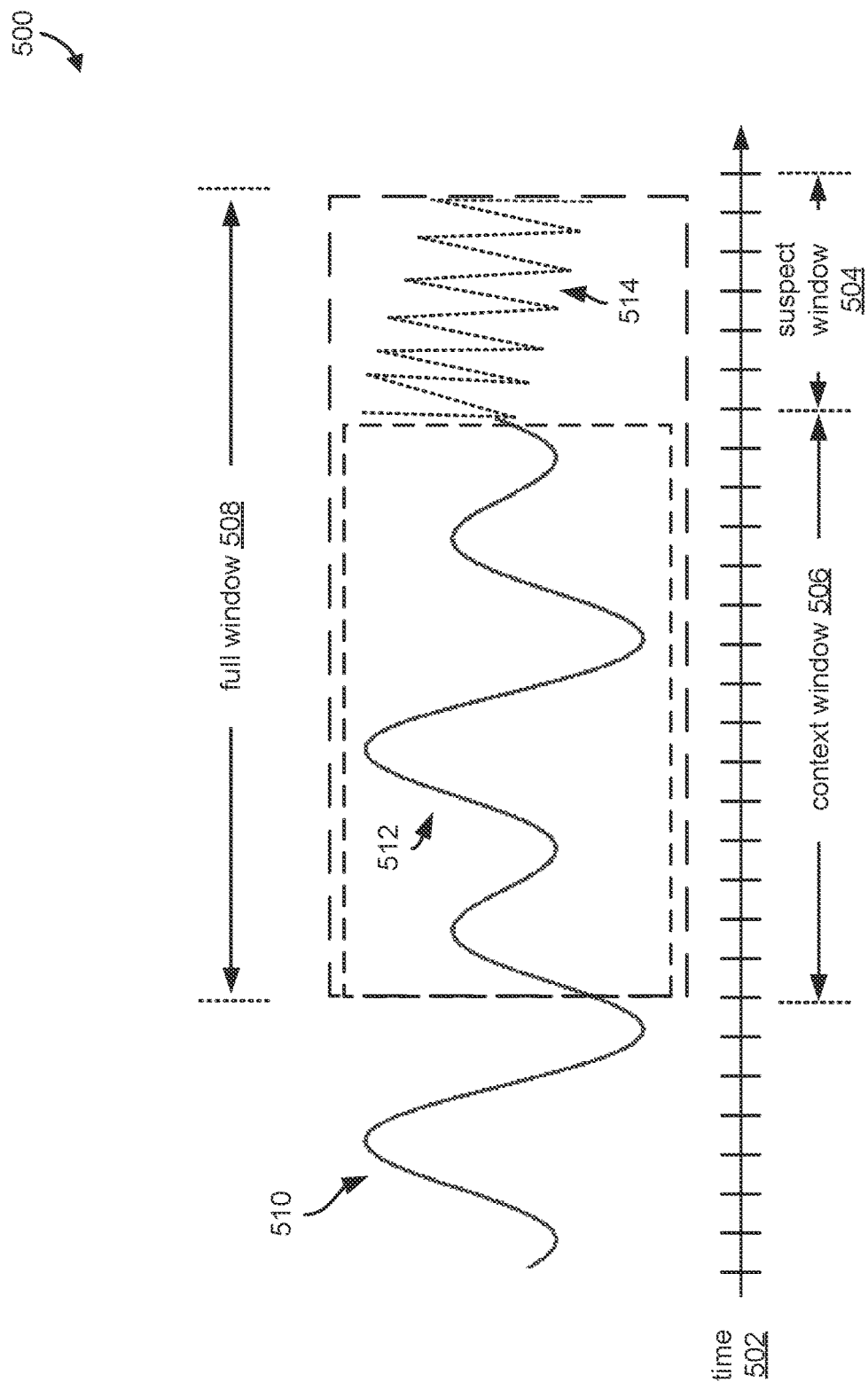
FIG. 5 illustrates another example of time series data containing an anomaly in which the described techniques can be practiced.

FIGS. 3-5 illustrate examples of time series data, in which the described techniques for anomaly detection may be practiced. FIG. 3 illustrates an example of time series data 300 that does contain an anomaly. Time series data may be represented by curve 306 over a time 302. A specific window or segment of that data 308 of interest may be defined in a suspect window 304 of a certain length. FIG. 4 illustrates an example of time series data 406 containing an anomaly 408. As illustrated, time series data segment 408, contained in suspect window 404, may have noticeably different characteristics than the remainder of time series data 406, including a much shorter period of oscillation between a high and low value, a different shape of transitions between portions of increasing and decreasing values, and may not have a consistent minimum and maximum value. It should be appreciated that these differences are only given by way of example, and that any number of differences in data may detected via the techniques described herein.

FIG. 5 illustrates time series data 510, which may share one or more aspects with the time series data as illustrated in FIG. 4, but broken into a number of different segments or windows. As illustrated, time series data 510 may be segmented in a context window 506 containing data 512 that immediately precedes time series data 514 in suspect window 504. For purposes of example, context window 506 is depicted as preceding suspect window 504, however any temporal relation between context window and suspect window is contemplated herein.

In one specific example, a data source, such as data source 212, may be represented by a collection of N discrete-time time series data:

$$x_{1:T_i}^{(i)}, i=1, \ldots, N$$

where for time series i and time step $t=1, \ldots, T_i$ there is an observation:

$$x_t^{(i)} \in \mathbb{R}^1$$

For this example, assume that there is a corresponding, set of partial anomaly labels $$y_{1:T_i}^{(i)} \text{ with } y_t^{(i)} \in \{?, 1\}$$

indicating whether the corresponding observation is anomalous (1), or unlabeled/normal (?).

The goal is to predict anomaly labels $$\hat{y}_{1:T}, \text{ with } y_t \in \{0, 1\}$$

given a time series $X_{1:T}$. The time series $X_{1:T}$ may or may not have been part of the training set, such that both retrospective (batch) anomaly detection as well as the incremental setting are considered. Instead of predicting the binary labels directly, a positive anomaly score may be predicted for each time step, which can subsequently be thresholded to obtain anomaly labels satisfying a desired precision/recall trade.

While the univariate case is presented above, the described framework is generally applicable to the multivariate setting. In addition, the described techniques are also applicable to the case where negative labels are provided.

In some aspects, contrastive window based detection may be utilized. The time series problem (where each time series can potentially have a different length) can be converted to a vector problem by splitting each time series into a sequence of overlapping, fixed-size windows, with the aim of classifying each window as anomalous or not. Each of these length-S windows may be referred to as a suspect window. One important feature of the described approach is to use a second window, called the context window, to provide the model with additional context needed to detect anomalies in the suspect window. The length-C context window is chosen immediately preceding the suspect window, so that together they form whole windows of size L=C+S. A generic length-L whole window may be denoted as:

$$x \in \{x_{i:(i+L)} \mid i = 1, \ldots, T - L\} \text{ by } x = (x_{(c)}, x_{(s)})$$

composed of the context window $x_{(c)}$, and the suspect window $x_{(s)}$.

This segmentation not only allows training the model using a contrastive loss function, but also allows resolving a trade-off between long and short windows, as a longer context window length C can be used to include temporal patterns of the time series, while maintaining an accurate localization of anomalies, using a shorter suspect window length S. S and C are hyper parameters of the described techniques that may be selected based on the length of the temporal patterns in the time series.

The goal is to learn a function $f_\theta(x)$ that takes the entire window x as input, and returns a high anomaly score if (and only if) the suspect window part $x_{(s)}$ contains an anomaly. The approach to learning $f_\theta$ using the contrastive loss function relies on training examples $(x, y_s)$, where $y_s$ (0, 1) indicates whether the suspect window $x_{(s)}$ contains an anomaly. In the supervised setting, these suspect window labels can be directly constructed from y1:T. To additionally make use of unlabeled training data in the unsupervised and semi-supervised settings, training examples may be synthetically constructed with $y_s=1$ by injecting synthetic anomalies into the suspect window $x_{(s)}$. For this, various data augmentation techniques may be utilized, as will be described in greater detail below in reference to FIGS. 8 and 9. As used herein, injecting may include inserting, adding, or otherwise modifying data in some way to artificially create an anomaly within the data.

In some examples, a contrastive paradigm is utilized for anomaly detection. The proposed model identifies anomalies in a space of learned latent representations, building on the intuition that: if an anomaly is present in the suspect window $x_{(s)}$, then representation vectors constructed from x and $x_{(c)}$ should be distant.

Figure 6:
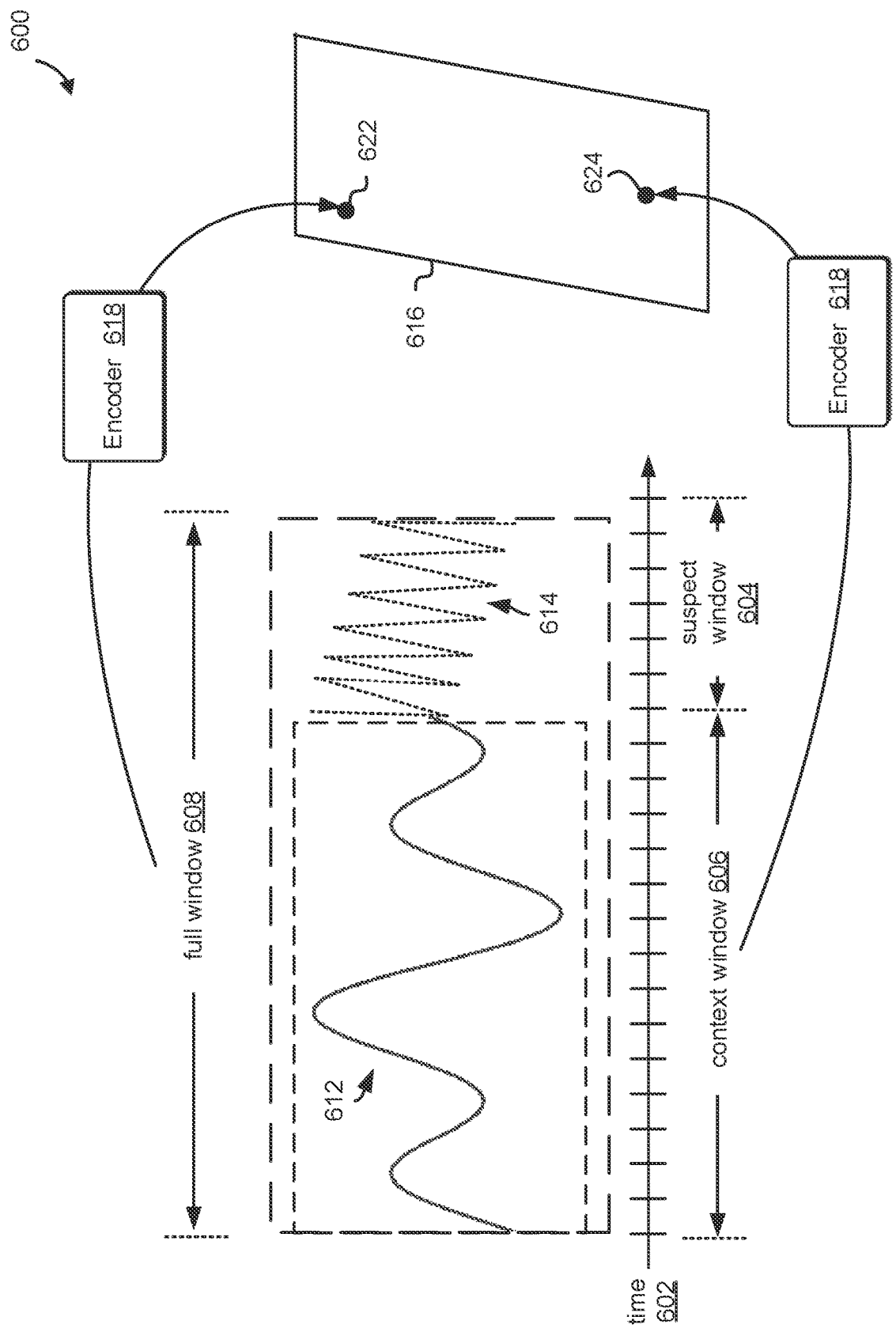
FIG. 6 illustrates another example of time series data containing an anomaly in which the described techniques can be practiced.

FIG. 6 illustrates another example of time series data 600 containing an anomaly that is mapped to a model or space 616 by an encoder 618. In the example illustrated, time series data 612 and 614 are encoded by an encoder 618 to a model space 616. Time series data 612 spans a context window 606 having a certain length of time 602 and time series data 614 spans a suspect window 604 having a certain length of time 602. Full window 608 is the combination of context window 606 and suspect window 604.

Time series data 612 and 614 combined, representing a full window 608, are encoded to a point or data structure 622, while time series data 612 of context window 606 is encoded to a point or data structure 624. As illustrated, time series data 604 is largely different in characteristics from time series data 612, and thus represents an anomaly in the data. Because time series data 614 differs from time series data 612, the mappings of points/data structures 622 and 624 are shown having a large distance between them, where distance may represent any of a number of different variables.

Figure 7:
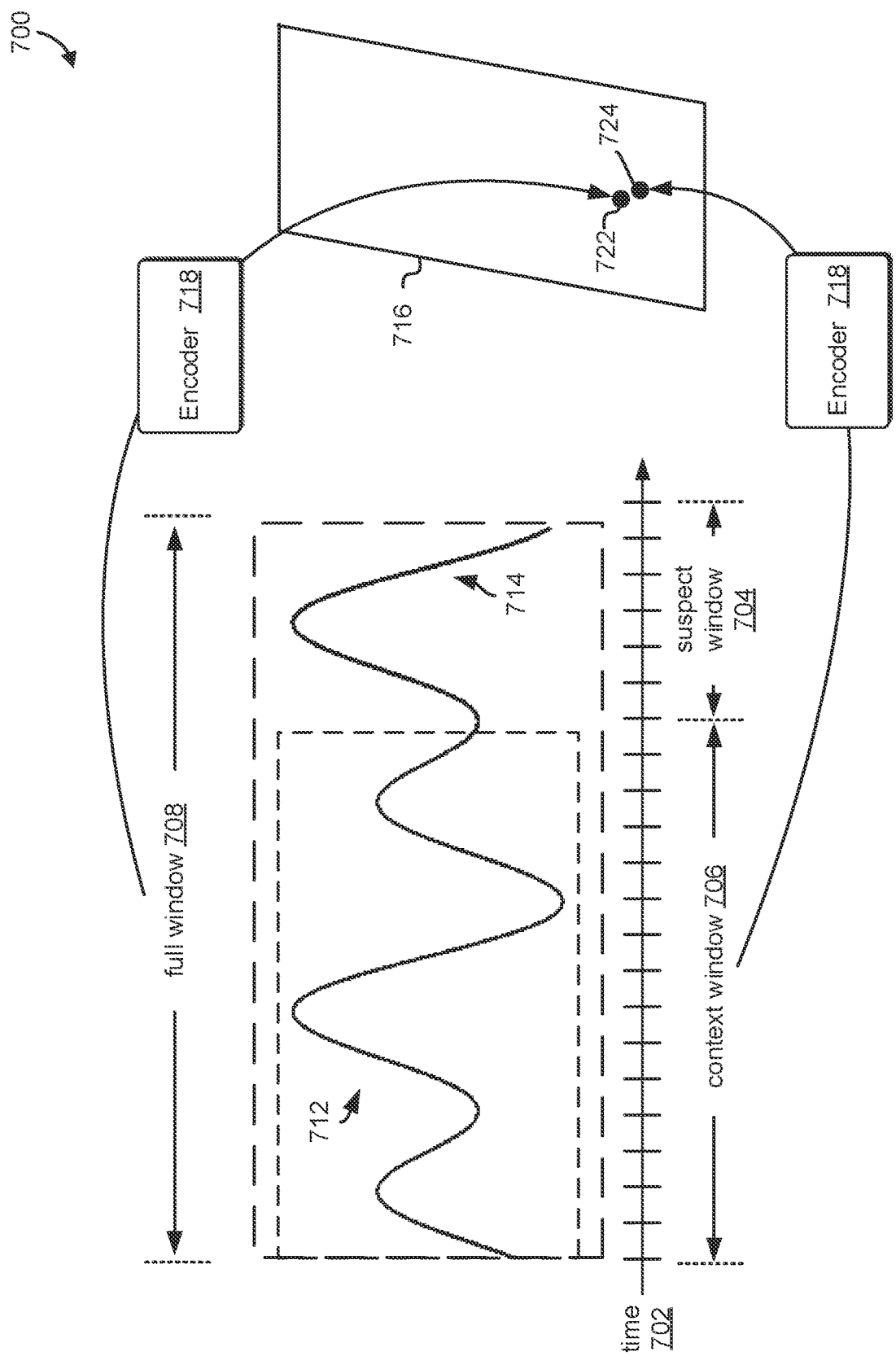
FIG. 7 illustrates an example of time series data in which the described techniques can be practiced.

FIG. 7 illustrates another example of time series data 700, which does not contain an anomaly, that is mapped to a model or space 716 by an encoder 718. In the example illustrated, time series data 712 and 714 are encoded by an encoder 718 to a model space 716, with data 712 spanning context window 706 and data 714 spanning suspect window 704. Full window 708 is the combination of context window 706 and suspect window 704.

Time series data 712 and 714 combined, representing a full window 708, are encoded to a point or data structure 722, while time series data 712 of context window 706 is encoded to a point or data structure 724. As illustrated, time series data 704 is similar to time series data 712 in various aspects, and thus represents continuous or congruous data. Because time series data 714 is similar to time series data 712, the mappings of points/data structures 722 and 724 are shown proximate to each other, having a small distance there between.

As described above, encoder 618, 718 may include one or more computing resources or processes for transforming data, such as time series data into representations using a variety of functions, machine learning models, etc. Encoder 618, 718 may compute a contrastive distance score of the embeddings/representations of different segments of time series data. Encoder 618, 718 may train model/representative space 616, 716 to give a high score for instances with an anomaly in the suspect window. Encoder 618, 718 may include three primary components: a neural network encoder $g\theta( )$ a distance-like function, and a binary classification loss or similar function.

A neural network encoder $g\theta( )$ such as encoder 618, 718 maps input sequences to representation vectors in $R^E$. The same encoder is applied both to the full window and to the context window, resulting in representations $z=g\theta(x)$ and $z(c)=g\theta(x(c))$, respectively. A convulsion neural network, such as with exponentially dilated causal convolutions may be used and in some examples, in particular a temporal convolution neural network (TCN) architecture with max-pooling applied across the time dimension of the output.

A distance-like function, such as:

$$\text{dist}(\cdot, \cdot): \mathbb{R}^E \times \mathbb{R}^E \to \mathbb{R}_+$$

may be used to compute the similarity between the representations z and z(c). This distance directly serves as the anomaly score:

$$f_\theta(x) = \text{dist}(g_\theta(x), g_\theta(x_{(c)}))$$

In some examples, the cosine distance, logarithmically transformed to R+ may be used.

A binary classification loss, $l(\cdot, \cdot)$, may be applied to the anomaly score and the corresponding suspect window label, such that the loss for a given training example (x, ys) is:

$$l(f_\theta(x), y_s)$$

In some examples, binary cross-entropy loss may be applied after transforming the scores from R+ to pseudo-probabilities in [0, 1] via $$p = 1 - \exp(-f_\theta(x))$$

The parameters θ of the encoder gθ are learned by minimizing the classification loss on minibatches of length L windows, x. These are sampled uniformly at random (across time series and across time) from training data set $$\left\{ x_{1:T_i}^{(i)} \right\}$$

after applying the data augmentation techniques described in greater detail below.

For a given window x=(x(c), x(s)), the described contrastive approach parametrizes the probability of x(s) containing an anomaly:

$$p(y_{(s)} = 1 | x).$$

as a function of the distance between the representations of the whole window x and the contained context window x(c). One motivation for selecting this particular parametrization—apart from its intuitive appeal—is that the encoder gθ(x) can be pre-trained in an unsupervised fashion, e.g., using a triplet loss approach. Empirically, it has been observed that this contrastive parametrization outperforms a plain classification loss based on the same encoder architecture, even without pre-training.

While the above-described window based $\hat{y}_{1:T}$ approach allows the model to determine if an anomaly is present in the suspect window, in many applications it is important to react quickly when an anomaly occurs, or to locate the anomaly with accuracy. To support these requirements, the model may be applied on rolling windows of the time series. Each time point can then be part of different suspect windows corresponding to different rolling windows, where these multiple predictions can be used in different ways: to reduce time to alert, the system can alert on the first score above a threshold; to locate anomalies with high accuracy, accumulate the predictions of different rolling windows to pin-point the anomalies in time. In the latter case, the final timestep predictions for a given time series $X_{1:T}$, are obtained by rolling the trained classifier along the time dimension and aggregating the predicted probabilities. The rolling windows are moved forward using a stride parameter K, which can be selected to be a divisor of the suspect window length. For each time step, $$n_K = L_{(s)}/K \in \mathbb{N}$$

predictions can be generated. To aggregate the multiple predictions, one could use different methods, such as averaging, majority voting or even Shapley values. In experiments, it was determined that simple averaging of the anomaly probabilities of all suspect windows S(t) that contain t works well:

$$\hat{y}_t = \frac{1}{N} \sum_{S(t)} p_{(s)}$$

However, other approaches are also contemplated herein.

Relying solely on labeled ground-truth anomalies to learn fθ is often ineffective in the context of anomaly detection due to the scarcity of labeled instances, and the severe imbalance between the nominal and anomalous classes. These challenges can be addressed by introducing often simple yet effective data augmentation methods that inject synthetic anomalies, allowing use of a supervised training without requiring ground-truth labels.

These data augmentation methods explicitly do not attempt to characterize the full data distribution of anomalies, which would be infeasible. Rather, effective generic heuristics that work well for detecting common types of out-of-distribution examples are combined with specific injection methods to capture anomalies that are of particular interest. In terms of generic heuristics, change point anomalies can be used. In yet other examples, two previously data augmentation techniques can be adapted to the time series setting: Outlier Exposure (OE) and Mixup. In addition, simple generative procedures for constructing synthetic anomalies that are aligned with specific failure modes can also be employed.

Figure 8:
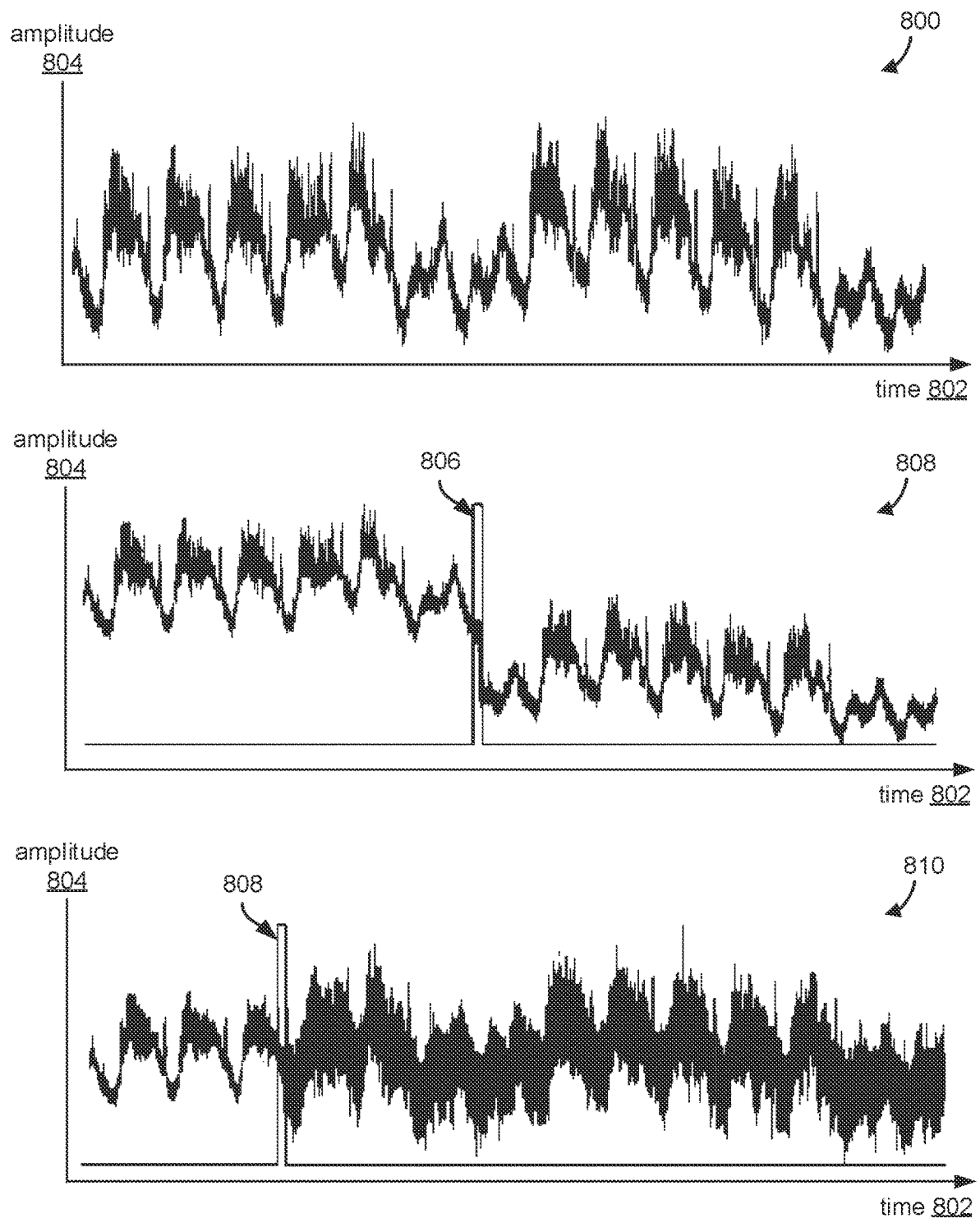
FIG. 8 illustrates an example of time series data including a synthetic anomaly in which the described techniques can be practiced.

FIG. 8 illustrates multiple examples of time series data 800, 808, 810 including a synthetic anomaly in which the described techniques can be practiced. In many applications, it is possible to identify general characteristics of anomalies that should be detected. Some widely-known anomalous patterns include: unexpected spikes beyond the local range of normal variation; sudden changes in the location or scale of the series (change-points); interruption of seasonality, etc. These patterns of interest are particular to the application, but once identified, this knowledge can be used to improve models.

As illustrated in FIG. 8, time series data 800, represented by an amplitude 804 of some value changing over time 802, may have a number of characteristics. For example, data 800 may oscillate between similar amplitudes with a relatively stable frequency over a time period, may oscillate between different amplitudes for a subsequent time period, and then may return to the prior mode for yet another subsequent time period. The relatively consistent amplitudes and periods of these amplitudes may be reoccurring to indicate that this data represents normal behavior of the data/a system as a source of the data. The characteristics of this data may be observed and then used to inject one or more change points to create an artificial anomaly in the data.

For example, time series data 808 may represent or be similar to time series data 800, but with a change point 806 injected into the data. Change point 806 may be a change in amplitude 804, such that at or after the change point 806, the amplitude of data 808 may be significantly different from an amplitude of the data before the change point, thus indicative of an anomaly. In another example, time series data 810 may be similar to time series data 800, but with a different change point 808 injected into the data. Data subsequent to change point 810 may be changed in one or more ways to represent an anomaly. In the example illustrated, data after change point 808 may have a greater amplitude difference between oscillations and may be denser in amplitude. It should be appreciated that these are only examples, and that various other change points, varying in one or more dimensions may be introduced to a similar effect to generate synthetic anomalies within the data. In some cases, the change points may be selected or configured to emulate expected anomalies that are desired to be detected. This may include modifying any of amplitude, frequency, periodicity of certain portions, of the data to generate synthetic anomalies.

In some examples, contextual outliers may be introduced into time series data to create anomalies. Contextual outliers may generally refer to swapping portions of unlabeled time series data to generate anomalies. A simple task-agnostic method may be employed to create contextual out of distribution examples. For example, given a data window x=(x(c), x(s)), anomalies may be induced into the suspect segment, x(s), by replacing a chunk of its values with values taken from another time series. The replaced values in x(s) will most likely break the temporal relation with their neighboring context, therefore creating an out of distribution example. In some aspects, a contextual outlier exposure (COE) may be applied at training time by selecting random examples in a mini-batch and permuting intervals of random length and random location between their suspect windows.

Figure 9:
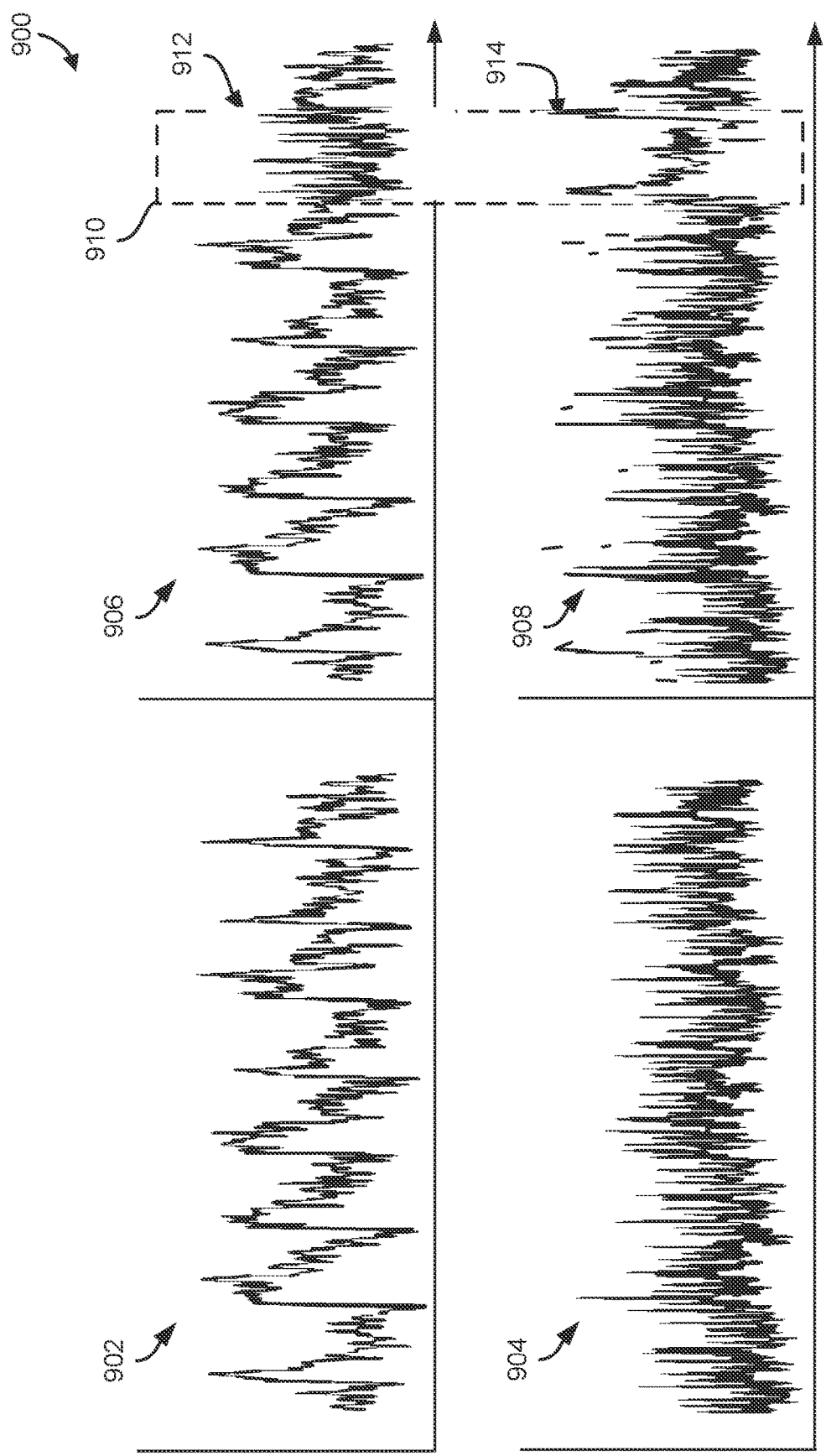
FIG. 9 illustrates another example of time series data including a synthetic anomaly in which the described techniques can be practiced.

FIG. 9 illustrates another set of examples of time series data 902, 904, 906, 908 in which synthetic anomalies may be introduced. As illustrated, two segments of time series data 902, 904 may have different characteristics. To generate one or more anomalies in this data, certain portions 912, 914 of each of data 902, 904 may be swapped or exchanged within a time window 910. The resultant time series data 906, 908 may thus have irregular characteristics starting and/or throughout the time period 910, thus artificially imposing an anomalies on the data 906, 908.

Another example data augmentation technique that may be used to inject synthetic anomalies into data is a window or segment mix-up. If little is known about the relevant anomalies, unspecialized injection methods such as outlier exposure or injection of point anomalies may be used, which may result in significantly mismatch between injected and true anomalies. To improve the generalization of the described techniques in this case, linear combinations of training examples can be created, inspired by the mix-up procedure.

A window mix-up technique was originally proposed in the context of computer vision, and creates new training examples out of original samples by using a convex combinations of the features and their labels. This data augmentation technique creates more variety in training examples, but more importantly, the soft labels result in smoother decision functions that generalize better. Despite being proposed for computer vision, the mix-up technique is ideal for time series applications: while convex combination of images typically don't result in reasonable new images, convex combinations of time series result in realistic and plausible new time series.

In one example, the following is sampled:

$$\lambda \sim \text{Beta}(\alpha,\alpha) \text{ using } \alpha=0.05$$

resulting in:

$$x_{new}=\lambda x^{(i)}+(1-\lambda)x^{(j)},$$

where $x^{(i)}$ and $x^{(j)}$ are two whole windows sampled from the batch $$y_{new}=\lambda y_s^{(i)}+(1-\lambda)y_s^{(j)},$$

where $y_s^{(i)}$ and $y_s^{(j)}$ are two corresponding labels.

While a few examples of data augmentation techniques have been described above, including change point, contextual outlier exposure, and window mix-up, it should be appreciated that any of a variety of data augmentation techniques may be similarly used to inject anomalies into data to aid in training models for more accurate and/or precise detection of anomalies.

Figure 10:
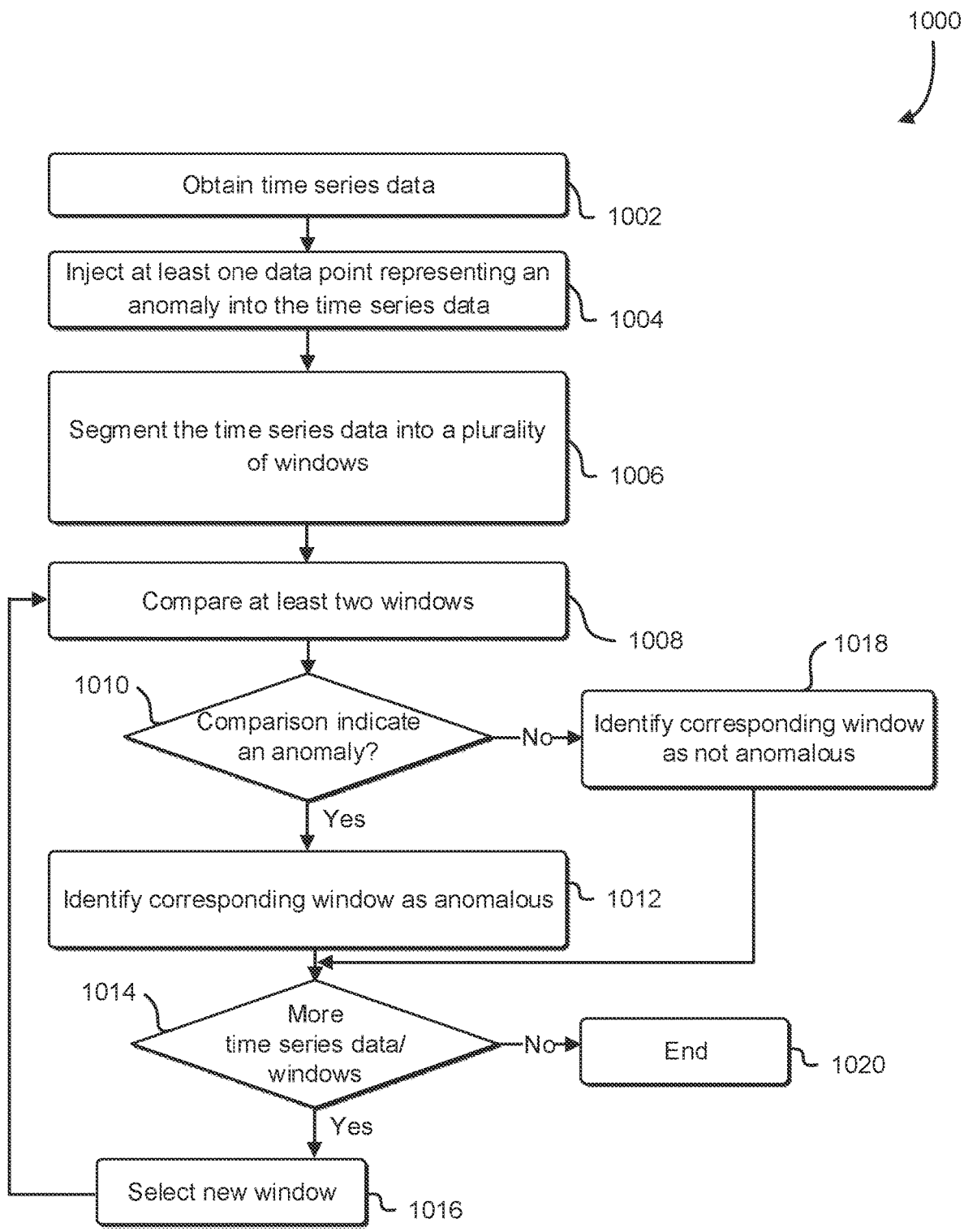
FIG. 10 illustrates an example process for detecting anomalies in time series data, according to at least one embodiment.

FIG. 10 illustrates an example process 1000 for detecting anomalies in time series data, according to at least one embodiment. In some aspects, process 1000 may be performed by anomaly detection service 112, 202, including any of anomaly generator 114, 206, anomaly classifier 116, 204, model trainer 208, and/or anomaly model 210, in conjunction with metrics service 110, and/or other services 122, as described above in reference to FIGS. 1 and 2.

Process 1000 may begin at operation 1002, in which data for analysis may be obtained by an anomaly detection service. The data may be time series data and may or may not include labels or other information used to classify or identify known anomalies within the data. It should be appreciated that process 1000 may be beneficially performed on any of unsupervised, semi-supervised, or supervised data.

Next at operation 1004, at least one data point, representing an anomaly, may be injected into the time series data. In some cases, the at least one data point may include various data and may span a single point in time or occur or represent data over a range of time or time period. In some cases, at least one characteristic of the at least one data point may be determined based on at least one characteristic of the time series data, such as amplitude, frequency, periodicity, or other features of the data. In some cases, the at least one data point may include a segment of the data taken from a first time period within the time series data and moved to a second period of time in the time series data. In some cases, the at least one data point representing the anomaly may be determined relative to one or more metrics that are specified or otherwise indicated as being of special interest. For example, latency or a latently based metric, such as time to respond to a given request, may be of particular interest for a given data set. In this example, the artificial anomaly may be configured based on what is an abnormal latency for the given data set. In other cases, the anomaly or anomalous data point(s) may be configured or generated agnostic to any assumptions of the time series data or specific knowledge of the time series data. Various examples of these types of anomaly generation techniques are described above in reference to FIGS. 7 and 8.

At operation 1006, the time series data may be segmented into a plurality of windows. In some aspects, operation 1006 may be performed by the anomaly detection service or may be performed by the source of the data itself. The length of the windows may be fixed, and in some cases, the relative location of the windows may be selected to be overlapping. The length of window or windows may be determined based on at least one temporal characteristic of the time series data. This may include selecting at least window size or length based on a periodicity of the underlying data, based on certain types of data or spikes in higher traffic to a service, time of data, patterns of data usage of a service, and the like.

At operation 1008, the at least two windows may be compared. This may include comparing a first window and second window of the plurality of windows to determine if the data in one window is largely different from the data in another window. In some examples, a first window may partially overlap or completely encompass a second window. In some examples the windows may be of the same or different size/length. The comparison may include using one or more models to determine if any differences or characteristics between the data corresponding to the different windows indicate that an anomaly is present in one of the windows. The one or models may be trained at least in part using the at least one injected anomaly. In some cases, an anomaly score may be generated based on the comparison, and then compared to one or more threshold values to determine if the differenced do indeed indicate that an anomaly of interest is present. The one or more threshold values may be determined empirically, selected or indicated via a request to identify one or more anomalies, or may be based on historical data. In some instances, a contrastive loss function may use to compare the different data windows, as described in greater detail above.

If the comparison is determined to indicate an anomaly, at operation 1010, then the corresponding window may be indicated as containing an anomaly, at operation 1012. If the comparison does not indicate an anomaly is present, the corresponding window may be indicated as non-anomalous, at operation 1018.

In either case, after operations 1012 or 1018, process 1000 may proceed to operation 1014, where the anomaly detection service may determine if there is more time series data to monitor. If there is more data, then a new time window may be selected, at operation 1016, such as a subsequent time window, and process 1000 may loop back to operation 1008 and continue to loop through operations 1008, 1010, 1012, 1014, and 1018 until, at operation 1014, it is determined that no more data is available for monitoring, at which point process 1000 may end at 1020.

Figure 11:
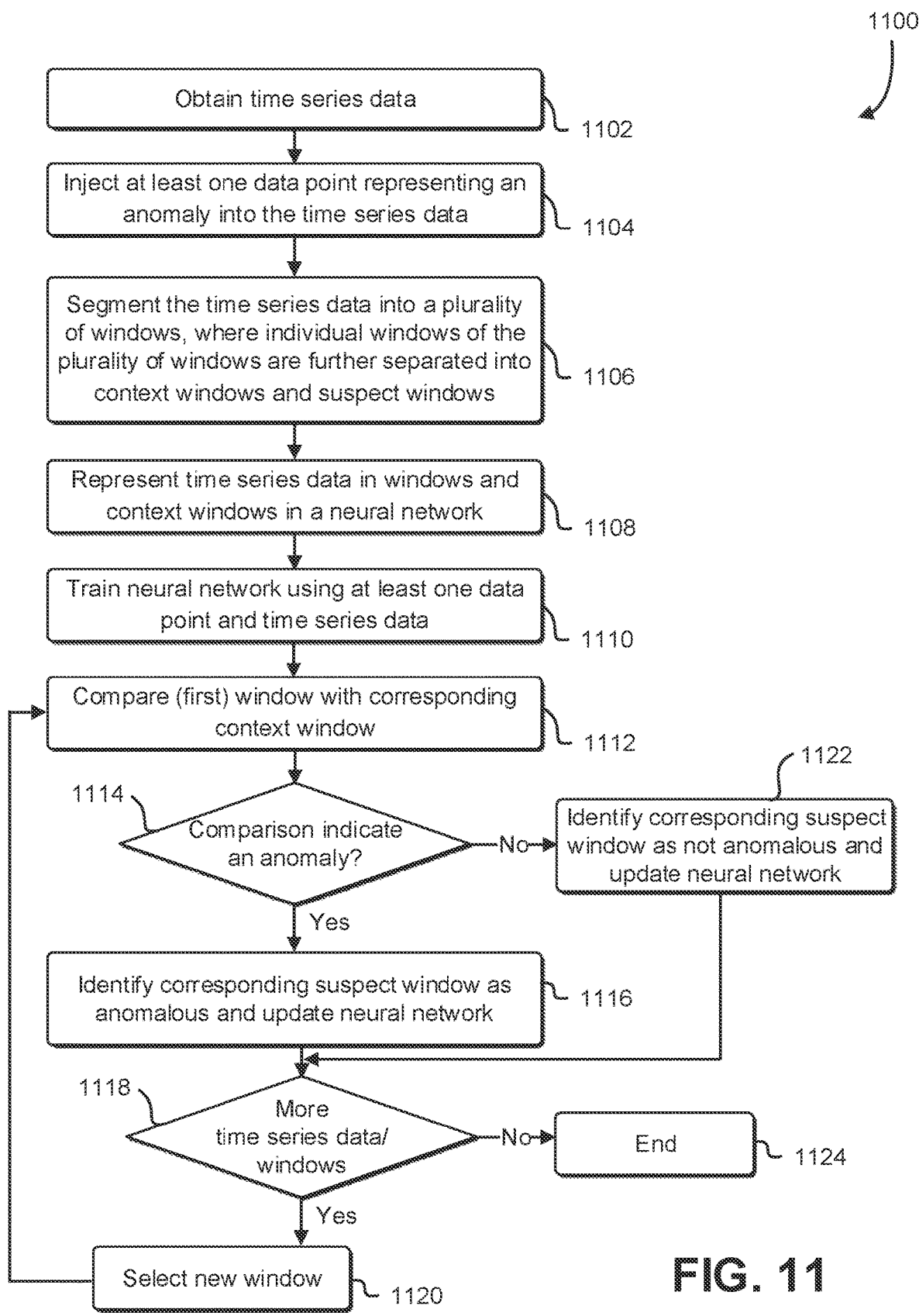
FIG. 11 illustrates another example process for detecting anomalies in time series data, according to at least one embodiment.

FIG. 11 illustrates another example process 1100 for detecting anomalies in time series data, according to at least one embodiment. In some aspects, process 1000 may be performed by anomaly detection service 112, 202, including any of anomaly generator 114, 206, anomaly classifier 116, 204, model trainer 208, and/or anomaly model 210, in conjunction with metrics service 110, and/or other services 122, as described above in reference to FIGS. 1 and 2. Process 1100 may include one or more aspects of process 1000 described above, and for the sake of brevity, those similar aspects will not be described again here.

Process 1100 may begin at operation 1102, in which time series data for analysis may be obtained by an anomaly detection service. Next at operation 1104, at least one data point, representing an anomaly, may be injected into the time series data. In some cases, determining at least one of a temporal location or an amplitude of the at least one data point is based on at least one characteristic of the time series data itself.

At operation 1106, the time series data may be segmented into a plurality of windows, where individual windows may be separated into context and suspect windows, as described above in reference to FIGS. 3-7. The length of one or more of a first window, a length of the context window, or the length of the suspect window, may be determined based on at least one temporal characteristic of the time series data. This may include selecting at least window size or length based on a periodicity of the underlying data, based on certain types of data or spikes in higher traffic to a service, time of data, patterns of data usage of a service, and the like.

At operation 1108, the time series data may be represented in one or more neural networks. In some cases, a convolution neural network or temporal convolution neural network may be used, as described in greater detail above. The one or more neural networks may be trained using the injected at least one data point in combination with the time series data, at operation 1112.

At operation 1112, a first window may be compared to its corresponding suspect window, as described above in reference to FIGS. 3-7. In some cases, an anomaly score may be generated based on the comparison, and then compared to one or more threshold values to determine if the difference between the window and its corresponding suspect window do indeed indicate that an anomaly of interest is present. In some instances, a contrastive loss function may use to compare the different data windows, as described in greater detail above.

In some aspects, a given suspect window may be compared with multiple other windows to determine if an anomaly exists within the suspect window. In some cases, the windows that are fist determined may overlap, such that one at least part of a given suspect window may correspond to two of more different context windows. In this example, determining an anomaly score for a second suspect window may be based on a comparison of the time series data in a corresponding second window with the time series data in the second context window, based on the time series data in at least one of the first window, the first context window, or the first suspect window, and based on the at least one data point.

If the comparison is determined to indicate an anomaly, for example based on using the injected one or more anomalies, at operation 1114, then the corresponding suspect window may be indicated as containing an anomaly, at operation 1116. If the comparison does not indicate an anomaly is present, the corresponding suspect window may be indicated as non-anomalous, at operation 1122. In some cases, after either of operations 1116 or 1122, the one or more neural networks may be updated to reflect the new data and new determinations as to anomalies within the new data.

In either case, after operations 1116 or 1122, process 1100 may proceed to operation 1118, where the anomaly detection service may determine if there is more time series data to monitor. If there is more data, then a new time window may be selected, at operation 1120, such as a subsequent time window, and process 1100 may loop back to operation 1112 and continue to loop through operations 1112, 1114, 1116, 1118, and/or 1122 until, at operation 1118, it is determined that no more data is available for monitoring, at which point process 1100 may end at 1124.

Figure 12:
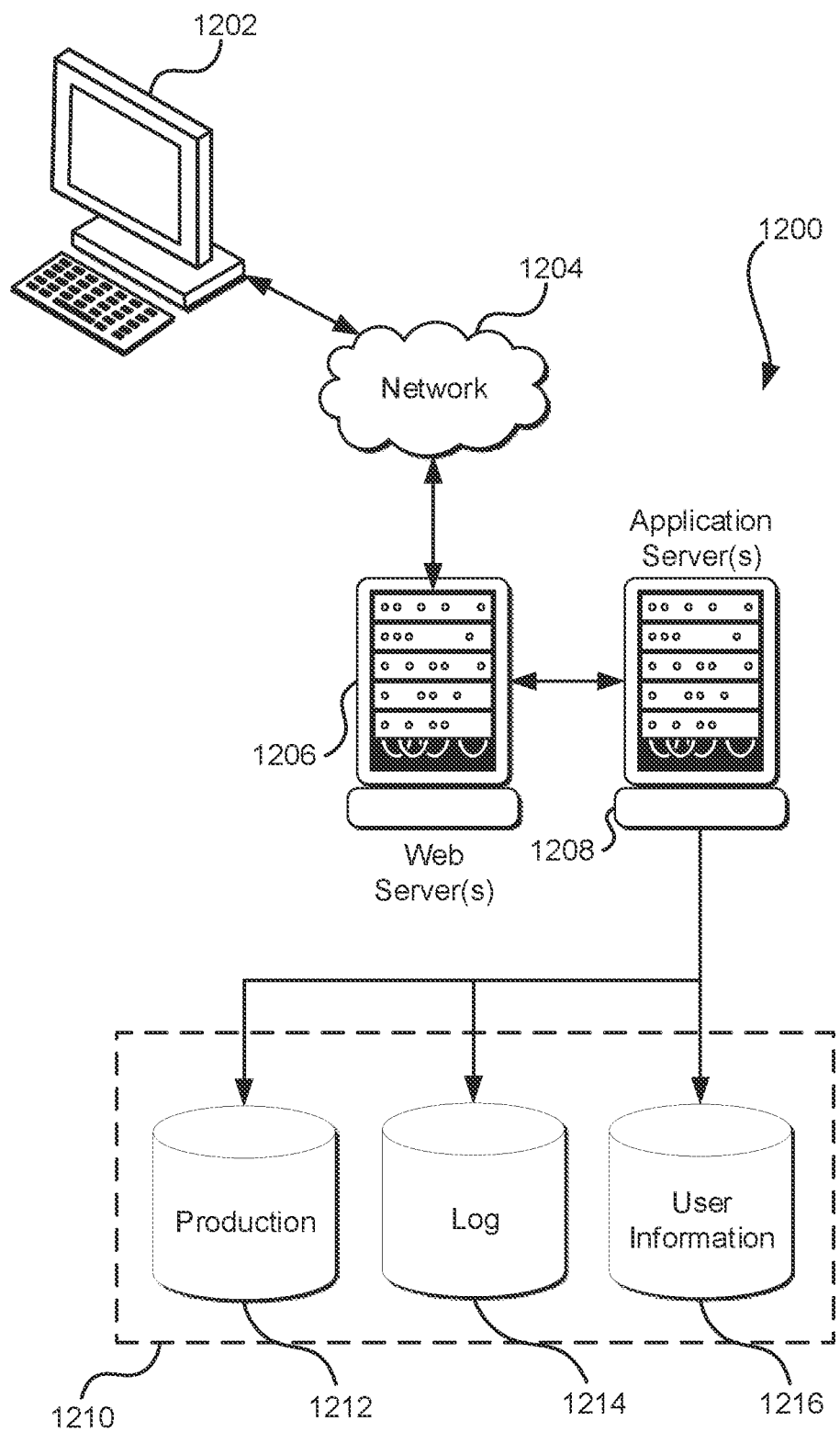
FIG. 12 illustrates a system in which various embodiments can be implemented.

FIG. 12 illustrates aspects of an example system 1200 for implementing aspects in accordance with an embodiment. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a data store 1210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1212 and user information 1216, which are used to serve content for the production side. The data store also is shown to include a mechanism for storing log data 1214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1210.

The data store 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In some examples, the application server(s) 1208 may host an anomaly detection service, such as service 112, 202 as described above. The anomaly detection service 112, 202 may obtain data from data source 120, 212, which may be store or obtained from data store 1210. In other cases, data source 120, 212 may originate or be obtained other services, such as hosted by application server(s) 1208.

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining time series data, the time series data comprising unlabeled data;
    injecting at least one data point into the time series data, the at least one data point representing a first anomaly relative to the time series data;
    segmenting the time series data into a plurality of overlapping windows, wherein a first window of the plurality of windows is further separated into a first context window and a first suspect window;
    training a neural network to detect anomalies in the time series data using at least a portion of the time series data and the at least one data point; and
    determining an anomaly score for the first suspect window based on a comparison of the time series data in the first window with the time series data in the first context window using the trained neural network, the anomaly score indicating a likelihood that the first suspect window contains a second anomaly.

2. The computer-implemented method of claim 1, wherein determining the anomaly score for the first suspect window further comprises using a contrastive loss function to compare the at least one data point with the first suspect window.

3. The computer-implemented method of claim 1, further comprising segmenting a second window of the plurality of windows into a second context window and a second suspect window, wherein determining the anomaly score further comprises comparing the first suspect window to at least two of the first window, the first context window, the second window, or the second context window.

4. The computer-implemented method of claim 1, further comprising determining at least one of a temporal location or an amplitude of the at least one data point within the time series data based on at least one characteristic of the time series data.

5. A system, comprising:
at least one processor;
memory that stores computer-executable instructions that, as a result of being executed by the one or more processors, cause the system to:
obtain time series data, the time series data comprising unlabeled data;
insert at least one data point into the time series data, the at least one data point representing a first anomaly relative to the time series data;
divide the time series data into a plurality of windows, the plurality of windows comprising a first window and a second window; and
determine an anomaly score for the first window based on a comparison of the time series data in at least the first window with the time series data in the second window and based on the at least one data point, the anomaly score indicating a likelihood that the first window contains a second anomaly.

6. The system of claim 5, wherein the computer-executable instructions further include instructions that further cause the system to:
train a model to detect anomalies in the time series data using at least a portion of the time series data and the at least one data point; and
determine the anomaly score for the first suspect window using the trained model.

7. The system of claim 6, wherein the model comprises a convolutional neural network.

8. The system of claim 6, wherein the computer-executable instructions further include instructions that further cause the system to:
determine the anomaly score for the first window using a contrastive loss function that compares the time series data in the first window with the time series data in the second window.

9. The system of claim 5, wherein the computer-executable instructions further include instructions that further cause the system to:
separate a first window of the plurality of windows into a first context window and a first suspect window; and
determine the anomaly score for the first suspect window based on a comparison of the time series data in the first window with the time series data in the first context window and based on the at least one data point.

10. The system of claim 9, wherein the computer-executable instructions further include instructions that further cause the system to:
separate a second window of the plurality of windows into a second context window and a second suspect window; and
determine an anomaly score for the second suspect window based on: a comparison of the time series data in the second window with the time series data in the second context window; the time series data in at least one of the first window, the first context window, or the first suspect window; and the at least one data point.

11. The system of claim 10, wherein the computer-executable instructions further include instructions that further cause the system to:
select the second window such that the second window at least partially overlaps the first window.

12. The system of claim 5, wherein the computer-executable instructions further include instructions that further cause the system to:
determine the at least one data point based on at least one characteristic of the time series data.

13. The system of claim 5, wherein the at least one data point comprises a portion of the time series data beginning at a first time in the time series data; and wherein the computer-executable instructions further include instructions that further cause the system to:
inject the at least one data point into the time series data at a second in the time series data.

14. The system of claim 5, wherein the computer-executable instructions further include instructions that further cause the system to:
determine at least one of a length of the first window, a length of the context window, or the length of the suspect window based on at least one temporal characteristic of the time series data.

15. A non-transitory computer-readable storage medium storing thereon executable instructions that, as a result of being executed by one or more processors of a computer system, cause the computer system to at least:
inject at least one data point into time series data, the at least one data point representing a first anomaly relative to the time series data;
segment the time series data into a plurality of windows, wherein a first window of the plurality of windows is further separated into a first context window and a first suspect window; and
determine an anomaly score for the first suspect window based on a comparison of the time series data in the first window with the time series data in the first context window and based on the at least one data point, the anomaly score indicating a likelihood that the first suspect window contains a second anomaly.

16. The non-transitory computer-readable storage medium of claim 15, wherein the instructions further comprise instructions that, as a result of being executed by the one or more processors, cause the computer system to:
train at least one model to detect anomalies in the time series data using at least a portion of the time series data and the at least one data point; and
determine the anomaly score for the first suspect window using the trained model.

17. The non-transitory computer-readable storage medium of claim 15, wherein the instructions further comprise instructions that, as a result of being executed by the one or more processors, cause the computer system to:
determine the anomaly score for the first suspect window using a contrastive loss function.

18. The non-transitory computer-readable storage medium of claim 15, wherein the instructions further comprise instructions that, as a result of being executed by the one or more processors, cause the computer system to:
separate a second window of the plurality of windows into a second context window and a second suspect window; and
determine an anomaly score for the second suspect window based on a comparison of the time series data in the second window with the time series data in the second context window, based on the time series data in at least one of the first window, the first context window, or the first suspect window, and based on the at least one data point.

19. The non-transitory computer-readable storage medium of claim 15, wherein the instructions further comprise instructions that, as a result of being executed by the one or more processors, cause the computer system to select the second window such that the second window at least partially overlaps the first window.

20. The non-transitory computer-readable storage medium of claim 15, wherein the time series data further comprises labeled data.

* * * * *